United States Patent Office 3,144,472
Patented Aug. 11, 1964

3,144,472
PREPARATION OF CYCLOPENTADIENYL VANADIUM TETRACARBONYL COMPOUNDS
Robert P. M. Werner, Binningen, Basel-Land, Switzerland, and Switlana Manastyrskyj, Warren, Mich., assignors to Ethyl Corporation, New York, N.Y., a corporation of Virginia
No Drawing. Filed Dec. 11, 1961, Ser. No. 158,564
4 Claims. (Cl. 260—429)

This invention relates to a novel process for forming organometallic compounds. More specifically, the invention relates to a novel process for forming cyclopentadienyl vanadium tetracarbonyls.

An object of this invention is to provide a novel process for preparing new organometallic compounds. A further object is to provide a process for producing stable cyclopentadienyl tetracarbonyl compounds of vanadium. Additional objects of this invention will be apparent from the following discussion and the appended claims.

The objects of this invention are accomplished by providing a process for the formation of organometallic complexes having the formula $QV(CO)_4$, where Q is selected from the class consisting of the cyclopentadienyl radical and hydrocarbon substituted cyclopentadienyl radicals having 6 to 13 carbon atoms, said process comprising reacting (A) a compound having the formula $ME_xV(CO)_6$, where M is selected from the class consisting of alkali and alkaline earth metal atoms, E is selected from the class consisting of bidentate and tridentate ethers, $x$ is an integer having the value of three when E is a bidentate ether and two when E is a tridentate ether, with (B) a compound selected from the class consisting of alkaline earth metal cyclopentadienyl complexes and alkali metal-cyclopentadienyl complexes wherein the cyclopentadienyl moiety is selected from the class consisting of the cyclopentadienyl radical and hydrocarbon substituted cyclopentadienyl radicals having 6 to 13 carbon atoms, said process being carried out in the presence of an oxidizing agent and at a temperature of about 25° to about 100° C.

Additional objects of this invention are accomplished by providing a process in which an oxidizing agent, usually a halide of a Group IIB metal, is reacted with an alkali or alkaline earth metal-etherate hexacarbonyl vanadate (−1) and an alkali or alkaline earth metal cyclopentadienyl complex in the presence of an ether solvent. For example:

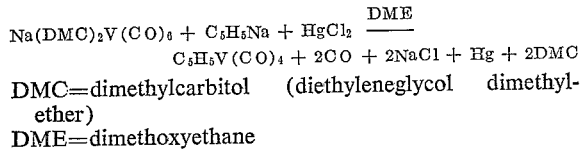

DMC=dimethylcarbitol (diethyleneglycol dimethylether)
DME=dimethoxyethane

Fischer et al.'s method, Z. Naturforschg., 9B, 503 (1954), yields cyclopentadienyl vanadium tetracarbonyl in yields of 30 to 42 percent, based on the weight of the vanadium tetrachloride used as a starting material. The novel process described herein produces the cyclopentadienyl vanadium tetracarbonyl compound in yields of 48 to 55 percent based on the weight of vanadium trichloride employed. The new process described herein is decidedly simpler than Fischer et al.'s method. Fischer et al.'s method entails six specific steps. The first step is the preparation of a cyclopentadienyl Grignard reagent. This Grignard reagent is then reacted with vanadium tetrachloride to yield a mixture of bis(cyclopentadienyl) magnesium and bis(cyclopentadienyl) vanadium. These two products are then removed by sublimation. After the sublimation the mixture of the two products, bis(cyclopentadienyl) magnesium and bis(cyclopentadienyl) vanadium, is carboxylated in an ether solution using carbon dioxide as the carboxylating agent. After a second sublimation, bis(cyclopentadienyl) vanadium is obtained. Then the bis(cyclopentadienyl) vanadium is carbonylated, using carbon monoxide to obtain cyclopentadienyl vanadium tetracarbonyl.

The total novel process of this invention, including steps described in the copending application of Werner and Podall cited below, involves reductive carbonylation of a vanadium trihalide in the presence of a Group IA–IIA metal and an ether with carbon monoxide to yield a Group IA–IIA metal etherate compound described in the previous publication, Chem. and Ind., 144 (1961). This Group IA–IIA derivative of the cyclopentadiene hydrocarbons, in the presence of an oxidizing agent to yield the desired compound in an impure state. The desired product is then purified by sublimation.

The process of preparing the compounds of this invention involves the use of an oxidizing agent. Since the formal oxidation state of the transition metals in the etherate sodium hexacarbonyl vanadate is −1, an oxidizing agent is used to facilitate formation of the tetracarbonyl cyclopentadienyl complexes wherein the vanadium is in the +1 oxidation state.

The oxidizing agent can be selected from a wide variety of oxidants known in the art. For example, it can be a simple salt of a Group IB or IIB metal such as a metal halide or metal oxyhalide, or a complex oxidant such as Tollen's reagent. Salts such as silver thiocyanate, silver cyanate, copper chloride, copper bromide and the like can be employed as the oxidant. Many other oxidizing techniques such as electrolytic oxidation, oxidation with air, oxygen or ozone, can also be employed. The common oxidizing agents, potassium dichromate, potassium permanganate and the like can also be employed. However, they are not preferred since reactions conducted in their presence are not easily controlled and undesirable side reactions occur.

The oxidizing agent is preferably selected from those metal halides which are both readily reduced and do not form cyclopentadienyl compounds of exceeding stability. The metal halides which are preferably employed as oxidants in our process are the Group IIB dihalides. More preferably, the oxidant is a mercury dihalide. Mixtures of the above metal halides may be employed in our process. As an example, we can employ a mixture of mercury and zinc dihalides as the oxidant.

The halogen anions present in the metal salts used as oxidants in our process are fluorine, chlorine, bromine, and iodine. In addition, salts containing pseudohalogenic anions may also be employed. For example, CN−, CNS−, CNO− salts of the above described metals can be utilized. Hypohalite anions such as OCl−, OBr−, and OI− may also be present in the salts employed. Preferably, the anion present in the salt used as an oxidant is a halogen, and most preferably, it is chlorine. Hence, the most preferred metal halide used in our process is $HgCl_2$.

The molar ratio of the Group IIB metal halide and the alkali or alkaline earth metal cyclopentadienyl complex and the etherate sodium hexacarbonyl vanadates employed in the process of this invention is not critical. However, we prefer to use an approximately equivalent mixture of the Group IIB metal halides and the alkali or alkaline earth metal cyclopentadienyl complex, because good yields are obtained without excessive wasting of a reactant. A preferred molar ratio range is from about 1.2:1.2:1.0 to about 1.5:1.5:1.0 (metal halide:cyclopentadienyl-alkali or alkaline earth metal complex:etherate sodium hexacarbonyl vanadate).

The ether solvent may be a cyclic or straight-chain ether and can contain one or a plurality of ether linkages. Typical ethers which are representative of those employed in our process are diethylether, dibutylether, dioxane, diethyleneglycol dimethylether, ethyleneglycol diethylether, diethyleneglycol diethylether, and ethyleneglycol dimethylether (dimethoxyethane, DME).

The preferred solvent is dimethoxyethane. This ether is a satisfactory solvent for all three reactants. Dimethoxyethane is also preferred because it has a relatively low boiling point. This greatly facilitates removal of the solvent after the reaction has been completed. This solvent is relatively non-toxic. Therefore, it can be used in large quantities without elaborate safety precautions. All solvents are preferably carefully de-aerated and purified prior to use.

The essential portion of the alkali and alkaline earth metal etherate salts of vanadium used as the starting compound in our process is the anion $V(CO)_6^-$. The other portions of the molecule, namely the alkali and alkaline earth metal and the ether, do not touch the heart of the process. Hence, any and all the vanadium compounds preparable by the process disclosed in the copending application, Serial No. 80,542, "Organometallic Compounds," R. P. M. Werner and H. E. Podall, filed January 4, 1961, now abandoned, can be used in this process. Illustrative compounds are sodium bis(diethyleneglycol dimethylether) hexacarbonyl vanadate (−1), potassium bis(diethyleneglycol dibutylether) hexacarbonyl vanadate (−1), and the like, the latter compound illustrating that ethers having up to about 12 carbon atoms are suitable. Though similar derivatives of bidentate and monodentate ethers can be utilized, we prefer to use the tridentate ether derivatives illustrated above because they are the most stable alkali and alkaline earth metal-etherate salts of vanadium hexacarbonyls. We can utilize mixtures such as a mixture of the sodium and potassium salts of the hexacarbonyl vanadium etherate compounds. Because of their greater ease of preparability, we prefer to use the alkali metal-etherate vanadium hexacarbonyls. Since sodium and potassium are the most economical of these metals, their complexes are the most preferred. As disclosed in the aforementioned Werner et al. application, the alkali and alkaline earth metal hexacarbonyl vanadates are provided by a process in which the alkali metal or alkaline earth metal is reacted with a vanadium salt in the presence of an ether and carbon monoxide under pressure.

The alkali or alkaline earth metals which may be employed are lithium, sodium, potassium, rubidium, cesium, calcium, magnesium, strontium and barium. Preferably, the metal is an alkali metal and most preferably, it is sodium.

Of the vanadium salts which may be employed as a reactant, the vanadium halides and oxyhalides are preferred. Examples of this type of compound are the vanadium trichloride, vanadium trioxychloride, and vanadium tetrachloride.

In this process the ether is generally employed in a large excess since it functions as both a reactant and a solvent. The ether may be a cyclic or straight-chain ether and can contain one or a plurality of ether oxygen linkages. Preferably, the ether solvent is a tridentate ether, i.e., it contains three ether oxygen linkages in the molecule. The tridentate ethers are preferred because the tridentate ether-alkali metal and alkaline earth metal salts formed from this process are more stable than salts which contain a monodentate or a bidentate ether. As an example of the stability of the tridentate ether compounds, it has been found that sodium bis(diethyleneglycol dimethylether) hexacarbonyl vanadate can be recrystallized from diethylether without solvent exchange between the diethylether and the diethyleneglycol dimethylether. Typical ethers which are representative of those which are applicable in the process are diethylether, dibutylether, dioxane, diethyleneglycol dibutylether, e.g., diethylether, and diethyleneglycol dimethylether.

As stated previously, the hexacarbonyl vanadate salts are prepared by reacting the above ingredients under carbon monoxide pressure. Generally, carbon monoxide pressures ranging from 1,000 to 10,000 p.s.i. may be employed.

The process is carried out over a temperature range of from 60 to about 150° C. Preferably, the process is carried out at a temperature of about 100° C. In general, the reaction is complete in about 1 to 40 hours.

It has been found that the Group VB metal reactant should be added directly to the pressurized reaction vessel containing the reducing metal and the ether, both described above, and the carbon monoxide under pressure. On a relatively small scale, one convenient way of adding the Group VB metal reactant to the reaction vessel is to place it in a sealed vial made of a frangible material. The vial is placed in the reaction vessel along with the other reactants and the vessel is sealed and then pressurized with carbon monoxide. The agitation mechanism is then started and the vial is broken when the agitator strikes it so as to quickly release the vanadium reactant into the reaction system.

The alkali and alkaline earth metal-etherate salts of the hexacarbonyl vanadate anion are readily separated from the reaction mixture. One method of separation is by addition of a hydrocarbon such as petroleum ether, nonane, hexane or the like, to the filtered reaction mixture to precipitate the desired product. The product can then be removed by filtration, centrifugation or the like.

EXAMPLE I

A mixture comprising 47.2 grams of vanadium trichloride, 41.5 grams of sodium as a 50 percent dispersion in mineral oil and 900 ml. of diethyleneglycol dimethylether, which had been distilled over sodiobenzophenone, was charged to a reaction vessel. The reaction vessel was then pressurized to 3,000 p.s.i. with carbon monoxide and heated while agitating the reaction mixture. The reaction mixture was so heated at 100° C. for 20 hours during which time the reaction temperature was raised briefly to 150° C. The reaction vessel was then cooled and vented to relieve the carbon monoxide pressure and the reaction product was discharged. After filtration of the reaction product under a nitrogen atmosphere, petroleum ether was added to the stirred clear yellow filtrate. The resulting oil was triturated with fresh petroleum ether to yield 95 grams of crude yellow solid. This material was soluble in ether, water and acetone, and insoluble in petroleum ether. The material was then recrystallized from ether to produce a bright yellow crystalline solid having a melting point of 176° C. with decomposition. The product was relatively air stable. An aqueous solution of the yellow crystal material showed an alkaline pH and was strongly reducing. As an example of its reductive properties, the compound was capable of reducing sulfuric acid to hydrogen sulfide in diethyleneglycol dimethylether. On analysis there was found: C, 42.5; H, 5.52; V, 10.1; Na, 4.68. Calculated for $C_{18}H_{23}NaO_{12}V$: C, 42.37; H, 5.53; V, 9.98; Na, 4.50 percent. Further, the compound was subjected to magnetic susceptibility measurements and was found to be diamagnetic. The properties, analysis, and infrared absorption spectrum of the compound showed it to be sodium bis(diethyleneglycol dimethylether) hexacarbonyl vanadate, having the empirical formula

[Na(H₃C—O—CH₂—CH₂—O— 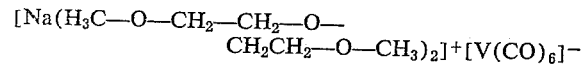

EXAMPLE II

A suspension comprising 5 moles of potassium admixed with 25 moles of dimethoxyethane is charged to a reaction vessel. There is then added one mole of vanadium tribromide in a frangible vial. On charging the reaction vessel with carbon monoxide to a pressure of 5,000 p.s.i., the agitation mechanism is started so as to break the frangible vial and release the vanadium tribromide. The reaction mixture is then heated to 60° C. for 10 hours after which the reaction vessel is cooled, vented, and the reaction product is discharged. On filtration, followed by addition of petroleum ether to the filtrate, a good yield of potassium tris(dimethoxyethane) hexacarbonyl vanadate is obtained.

The alkali or alkaline earth metal cyclopentadienyl compound used as a reactant in this process contains a cyclomatic radical, that is, a radical containing the cyclopentadienyl moiety. In general, such cyclomatic hydrocarbon groups can be represented by the formulae:

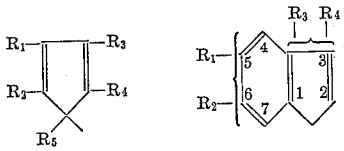

where each R is selected from the group consisting of hydrogen and univalent hydrocarbon radicals.

A preferred class of cyclomatic radicals suitable in the process of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. These radicals are preferred as they are the most readily available cyclomatic radicals and the vanadium cyclomatic coordination compounds obtainable from them have desirable characteristics which render them of superior utility.

The alkali metal atom which is present in the alkali metal cyclopentadienyl complex can be lithium, sodium, potassium, cesium or rubidium. We prefer to use the sodium and potassium derivatives because of the commercial availability of these two metals. Hence, compounds such as cyclopentadienyl sodium, ethylcyclopentadienyl potassium, and the like are preferred. The compounds are preferred over the alkaline earth metal derivatives such as cyclopentadiene strontium, cyclopentadiene calcium, cyclopentadienyl calcium, and cyclopentadienyl magnesium, because of their greater activity. The magnesium derivatives are the preferred alkaline earth metal cyclopentadienyl compounds.

The process may be carried out over a temperature range from about 0° C. to about 150° C. Temperatures higher than about 150° C. tend to increase the amount of decomposition occurring in the reaction and temperatures lower than about 0° C. tend to increase the reaction time beyond a practical limit. Preferably, the process is carried out at a temperature of about 25° C. to about 100° C., since at these temperatures yields are maximized while the undesired side reactions are minimized and the reaction time is not unduly prolonged. Generally, the process is carried out with agitation of the reaction mixture since this insures a more even reaction rate.

The process proceeds smoothly at atmospheric pressure. However, pressures as low as 0.1 of an atmosphere and as high as 150 atmospheres can be utilized. We prefer to use a pressure range of 0.5 to 1.8 atmospheres.

The time required for our process is not a truly independent variable, but is dependent to some degree upon the other process conditions employed. Thus, for example, if a relatively high temperature and a relatively high pressure, rapid agitation, and a fast rate of addition of one reactant to the reaction mixture are employed, the reaction time will be reduced. If on the other hand a relatively low temperature, a relatively low pressure, slight agitation and a slow addition of a reactant to the reaction mixture are used, the reaction time will be proportionately increased. In practice, the necessary reaction time is easily determined since the course of the reaction can be traced by observing the amount of carbon monoxide produced by the reaction, either volumetrically or manometrically. During the course of the reaction an increment in pressure or volume occurs. When the pressure or volume ceases to rise, this is evidence that the reaction is completed. In general, from about one to about 40 hours is sufficient, although, as stated above, other reaction times can be employed if the process conditions are varied accordingly. We prefer to use those reaction conditions that enable the reaction to be complete in about 1 to about 10 hours.

Our process is preferably carried out under a protective atmosphere. For this purpose we employ a blanket of an inert gas such as nitrogen, helium, argon, krypton, or the like in the reaction system. Because of its commercial availability, we prefer to use nitrogen gas for this purpose. Such gases can also be employed to increase the pressure in the reaction vessel if this is desired.

The products formed from our process are readily separated from the reaction mixture. A classical technique such as recrystallization or chromatography can be used. However, we prefer to use the following separation procedures.

The reaction mixture is first filtered under nitrogen to remove the insoluble products produced by the reaction. Then the solvent is removed by distillation, usually under reduced pressure, preferably using a rotary evaporator. The residual solids are then purified by sublimation. Removal of a trace of co-sublimed solid is effected by extraction of the crude sublimate with ether, followed by filtration and resublimation. Here again, instead of subliming the product, it can be either recrystallized from a suitable solvent or isolated by a chromatographic technique.

We have modified our separation procedure and are able to obviate the second sublimation by the following technique. After the reaction mixture is filtered under nitrogen and the solvent is removed, using reduced pressure and reduced temperature, the residual solids obtained by filtration under nitrogen are washed several times with water. Then, the precipitate is extracted with ether and the ether solution filtered under nitrogen. The ether is removed by distillation using a rotary evaporator. The solid crude product is then sublimed and then washed with ether. The product is then dried to obtain the pure product.

The following examples illustrate the use of our novel process for the preparation of the cyclomatic vanadium tetracarbonyl complexes. All parts and percentages are by weight unless otherwise indicated.

EXAMPLE III

*Preparation of Cyclopentadienyl Vanadium Tetracarbonyl*

A solution of 1.5 parts of cyclopentadienyl sodium, $C_5H_5Na$, in 75 parts of dimethoxyethane was poured into a suitable reaction vessel (previously swept with nitrogen) and equipped with heating, stirring and condensing means, a gas trap, and liquid inlet means. While stirring the solution, 5.0 parts of $HgCl_2$ dissolved in 75 parts of dimethoxyethane was added to the vessel. While stirring and maintaining the mixture under nitrogen at 25° C., 7.0 parts of bis(diethyleneglycol dimethylether) sodium hexacarbonyl vanadium (−1) dissolved in 70 parts of dimethoxyethane, was slowly added to the mixture. The addition was complete after two hours. The reaction mixture was filtered under nitrogen. The solvent was then removed using a rotary evaporator and the residual solids were extracted with water. The mixture was filtered under nitrogen and the precipitate washed several times with water. The precipitate was then extracted with ether and the ether solution filtered under nitrogen. The ether was removed by distillation using a rotary evaporator. The solid crude product was sublimed and then washed with ether. The product was then dried, no further re-sublimation was required. The yield of orange cyclopentadienyl vanadium tetracarbonyl was 78 percent. Qualitative infrared analysis of a $CS_2$ solution of the product demonstrated the presence of carbonyl groups since two strong maxima occurred at 1890 and 1982 cm.$^{-1}$, similar to the spectra of corresponding tantalum and niobium compounds. The compound melted at 139° C., under nitrogen, literature value 138° C. Calculated for $C_5H_5V(CO)_4$: C, 47.4; H, 2.2; V, 22.3. Found: C, 47.4; H, 2.1; V, 22.1.

Similarly, when the above process is repeated using 2,3,4,5-tetramethylcyclopentadienyl sodium and 3-butylindenylsodium in place of the compound cyclopentadienyl sodium, the compounds 2,3,4,5-tetramethylcyclopentadienyl vanadium tetracarbonyl and 3-butylindenyl vanadium tetracarbonyl are prepared.

EXAMPLE IV

The procedure of Example III is followed except that the following separation and purification technique is employed. After the reaction mixture is filtered under nitrogen, then the solvent is removed by distillation under reduced pressure. The residual solids are then purified by sublimation. Removal of a trace of co-sublimed solid is effected by extraction of the crude sublimation with ether followed by filtration and re-sublimation. A good yield of cyclopentadienyl vanadium tetracarbonyl is obtained.

EXAMPLE V

The procedure of Example III is repeated except the analogous strontium etherate salt of vanadium hexacarbonyl is used in place of the sodium etherate salt of vanadium hexacarbonyl. A good yield of cyclopentadienyl vanadium tetracarbonyl is prepared.

EXAMPLE VI

The procedure of Example III is repeated except the analogous calcium cyclopentadienide is used in place of cyclopentadienyl sodium. A good yield of cyclopentadienyl vanadium tetracarbonyl is prepared.

Our compounds are not only useful intermediates but are valuable metal plating compounds. In order to effect metal plating, our novel compounds are decomposed in an evacuated space containing the object to be plated. On decomposition they lay down a film on the metal target to be plated. The gaseous plating technique may be carried out in the presence of an inert gas so as to prevent oxidation of the metal surface to be plated. The following example illustrates the metal plating process.

EXAMPLE VII

*Vapor Phase Plating of a Steel With Cyclopentadienyl Vanadium Tetracarbonyl*

A suitable quantity of cyclopentadienyl vanadium tetracarbonyl is placed into a reservoir equipped with heating means. The reservoir is connected through a valve, to a plating chamber wherein the object to be plated, a steel plate, is supported. The steel plate is connected to a temperature measuring device. The plating chamber is equipped with an induction coil which surrounds the metal object to be plated. The plating chamber is connected to a cold trap downstream from the reservoir, and the cold trap is connected to a vacuum pump. The system is evacuated to a pressure less than 0.2 mm. of mercury. The reservoir is sufficiently heated to volatilize the cyclopentadienyl vanadium tetracarbonyl and to provide a steady continuous evolution of that compound. The temperature of the steel plate is raised to 200–300° C.

Upon contact of the vapor with the hot steel plate, a metallic vanadium-containing deposit is deposited on the plate. The organic vapors resulting from the decomposition of the plating compound together with the unused plating compound are collected in the cold trap. The unused material is recovered by suitable extraction and crystallization and used in another run.

Any material that can withstand a temperature of 200° C. can be plated with a vanadium containing deposit using this technique. Iron, copper, bronze, brass, chromium and various porcelains and other ceramics can be coated.

Plating vanadium metal upon a substrate comprises thermally decomposing a vapor consisting essentially of a cyclopentadienyl vanadium tetracarbonyl in contact with said substrate wherein said process is conducted at a temperature of from about 180° C. to about 600° C., and at a pressure of from about 0.01 mm. to about 10 mm. of mercury. Further, plating vanadium on a substrate comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

The temperature conditions coupled with pressure in the plating chamber forms the critical feature of the present process. Thus, where the temperature ranges from about 180° C. to about 600° C., preferably 250° C. to 500° C., and the pressure in the chamber ranges from about 0.01 to about 10 mm. of mercury, better plates are obtained having better adherence to the substrate and pinhole free surfaces.

In the process of this invention a carrier gas is not required or desirable. Generally carrier gases tend to react with the vanadium being plated to form carbides, nitrides, or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the cyclopentadienyl vanadium tetracarbonyl compound at temperatures from about 80° C. to about 200° C. The temperature used depends on the flow rate desired.

The flow rate of the vapor is dependent to a certain extent upon the amount of pressure in the plating chamber and the temperature to which the plating compound is subjected. Ordinarily the flow rates of the plating compound employed vary from about one foot per minute to about 30 feet per second although faster or slower rates can be employed.

The time required to plate vanadium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the chromium coating.

Well adherent vanadium metal coatings can be obtained through depositing its vapor directly upon any substrate that can withstand the plating conditions. Typical examples of substrates which may be plated are nickel, Pyrex glass, beryllium, molybdenum, graphite, ceramics, high temperature resistant plastics, and the like. The preferred substrates which can be plated are ferrous metal substrates, aluminum, and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sandblasting. The vapor plated coatings have even better adherence on slightly uneven surfaces, such as created by sandblasting, than on highly polished substrates. Thus, no desiring to be bound by theoretical considerations, it is felt that sandblasting permits a better anchoring effect of the deposited metal which penetrates into the small pits of the surface. On substrates such as graphite and ceramics where the surface is already nonuniform, if desired, degreasing can be performed to assure a clean plating surface. Other substrate pre-treatments known to the art can be employed, if desired, and will now be evident for the above and other substrates.

Types of apparatus which may be used for the plating operation are any of the apparatus described in the prior art, such as set forth by Lander and Germer in "Plating Molybdenum, Tungsten and Chromium by Thermal Deposition of Their Carbonyls," or by Powell, Campbell and Gonser in the book "Vapor Plating," John Wiley and Sons, New York, 1955, wherein a vacuum chamber is used.

Heating may be achieved by numerous methods. Generally, resistance heating, infrared heating or induction heating are used according to the nature of the substrate and the type of equipment employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 180° C. to 600° C., preferably 250 to 500° C., in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of a vanadium compound by ultrasonic frequency or by ultraviolet irradiation. The former process involves essentially the same procedure as employed in Example VII with the exception that an ultrasonic generator is proximately positioned to the plating apparatus. The vanadium compound is then heated to its decomposition threshold and thereafter the ultrasonic generator is utilized to effect final decomposition. Decomposition by ultraviolet irradiation involves essentially the same method as utilized in Example VII with the exception that in place of the resistance furnace there is utilized for heating a battery of ultraviolet and infrared lamps placed circumferentially around the outside of the heating chamber. The substrate to be heated is brought to a temperature just below the decomposition temperature of the vanadium plating agent with the infrared heating and thereafter decomposition is effected with ultraviolet rays.

Although the above techniques generally employ the vanadium plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of cyclopentadienyl vanadium tetracarbonyl. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection and as a heating element.

These new compounds of this invention are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide and the like.

The novel compounds of this invention are particularly useful as chemical intermediates, fuel and lubricating oil additives polymerization catalysts, combustion control additives, fungicides, herbicides, pesticides, and bactericides.

Having fully described the novel compounds of our invention, their utilities and the methods used in preparing the compounds, it is desired that this invention be limited only within the scope of the appended claims.

I claim:

1. Process for the formation of organovanadium complexes having the formula $$QV(CO)_4$$

where Q is selected from the class consisting of the cyclopentadienyl radical and hydrocarbon substituted cyclopentadienyl radicals having 6 to 13 carbon atoms, said process comprising reacting (A) a compound having the formula $ME_xV(CO)_6$ where M is selected from the class consisting of alkali and alkaline earth metal atoms, E is selected from the class consisting of bidentate and tridentate ethers having up to about 12 carbon atoms, x is an integer having the value of three when E is a bidentate ether and two when E is a tridentate ether, with (B) a compound selected from the class consisting of alkaline earth metal-cyclopentadienyl complexes and alkali metal-cyclopentadienyl complexes wherein the cyclopentadienyl moiety is selected from the class consisting of the cyclopentadienyl radical and hydrocarbon substituted cyclopentadienyl radicals having 6 to 13 carbon atoms, said process being carried out in the presence of an inert ether solvent and a readily reducible inorganic Group IIB metal halide and at a temperature of about 25° to about 100° C.

2. Process for the formation of cyclopentadienyl vanadium tetracarbonyl, said process comprising reacting bis(diethyleneglycol dimethylether) sodium hexacarbonyl vanadium (−1) with cyclopentadienyl sodium, said process being carried out in the presence of mercuric chloride and an inert ether solvent.

3. Process for the formation of cyclopentadienyl vanadium tetracarbonyl, said process comprising reacting bis(diethyleneglycol dimethylether) sodium hexacarbonyl vanadium (−1) with cyclopentadienyl sodium, said process being carried out in the presence of mercuric chloride and dimethoxyethane.

4. Process for the formation of cyclopentadienyl vanadium tetracarbonyl, said process comprising reacting bis(diethyleneglycol dimethylether) sodium hexacarbonyl vanadium (−1) with cyclopentadienyl sodium, said process being carried out in the presence of mercuric chloride and dimethoxyethane at a temperature within the range of about 25° C. to about 100° C.

References Cited in the file of this patent

UNITED STATES PATENTS

| | | |
|---|---|---|
| 2,818,416 | Brown et al. | Dec. 31, 1957 |
| 3,028,404 | Pearson et al. | Apr. 3, 1962 |
| 3,060,212 | Brown et al. | Oct. 23, 1962 |

UNITED STATES PATENT OFFICE
CERTIFICATE OF CORRECTION

Patent No. 3,144,472            August 11, 1964

Robert P. M. Werner et al.

It is hereby certified that error appears in the above numbered patent requiring correction and that the said Letters Patent should read as corrected below.

Column 2, line 14, for "IA-IIA derivative of the cyclopentadiene hydrocarbons, in" read -- IA or IIA metal etherate salt is then reacted with a Group IA-IIA derivative of the cyclopentadiene hydrocarbon, in --.

Signed and sealed this 5th day of January 1965.

(SEAL)
Attest:

ERNEST W. SWIDER
Attesting Officer

EDWARD J. BRENNER
Commissioner of Patents